April 9, 1929.  A. S. BAKER  1,708,824
TRAP NEST
Filed Oct. 5, 1927  3 Sheets-Sheet 1
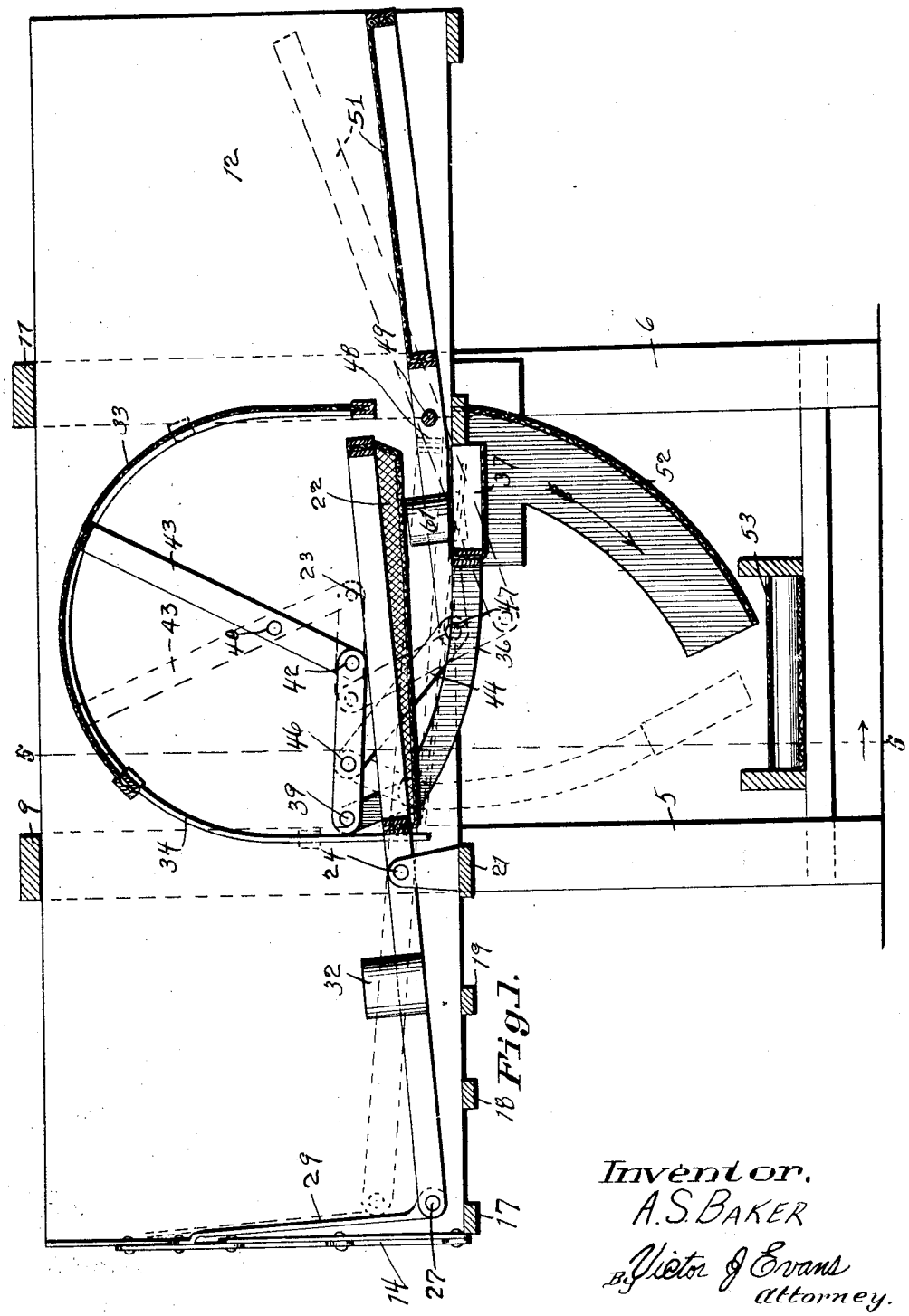
Inventor.
A. S. Baker
By Victor J. Evans
Attorney.

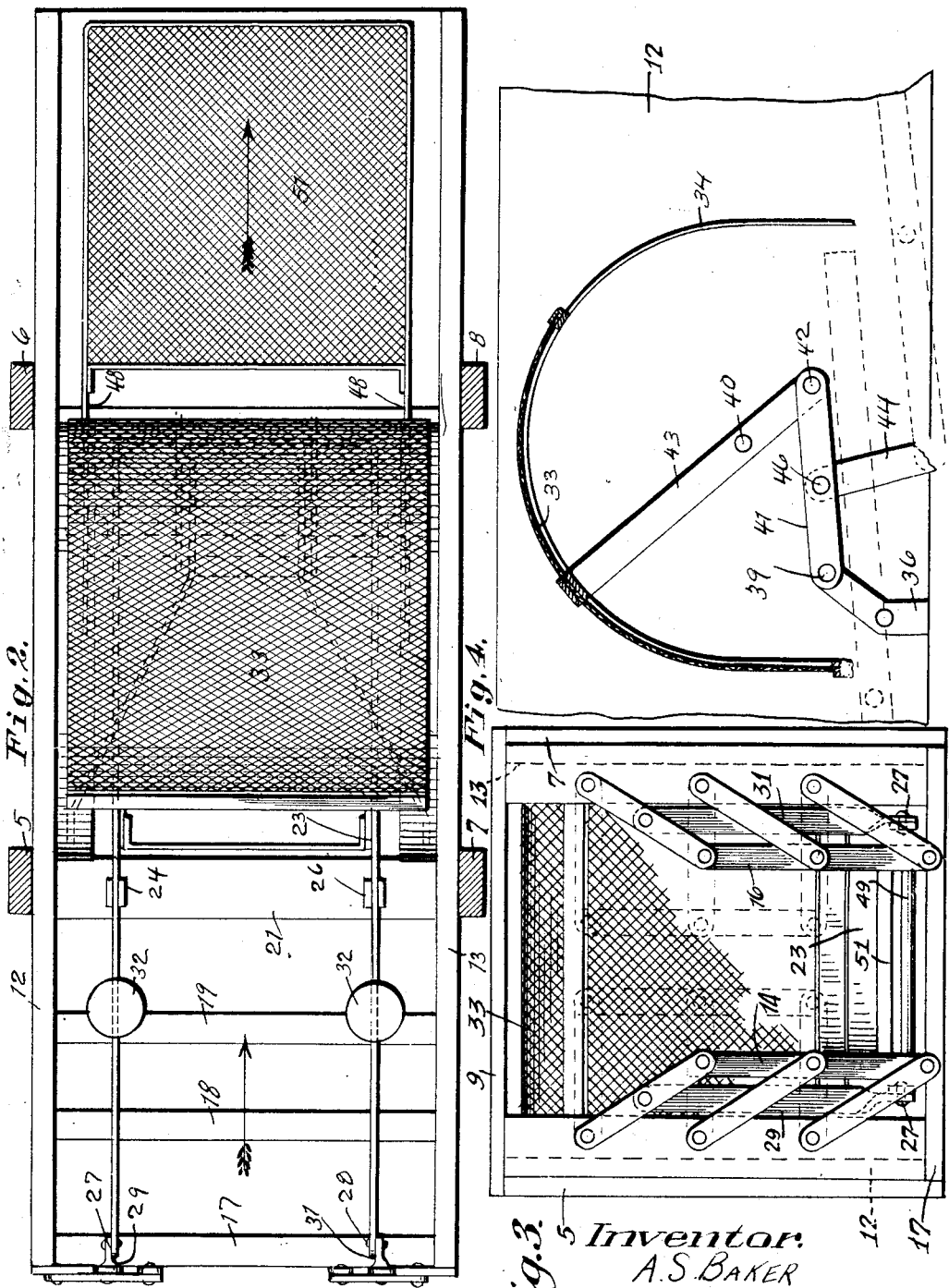

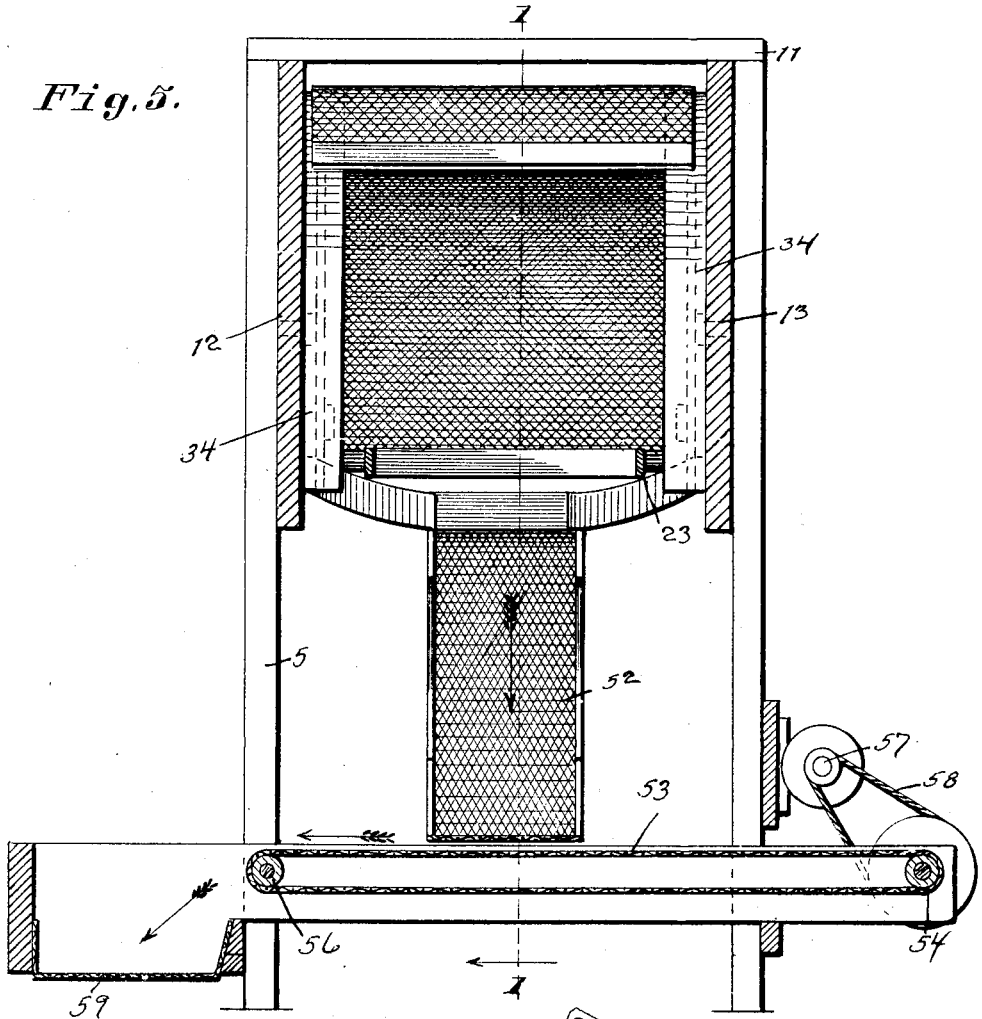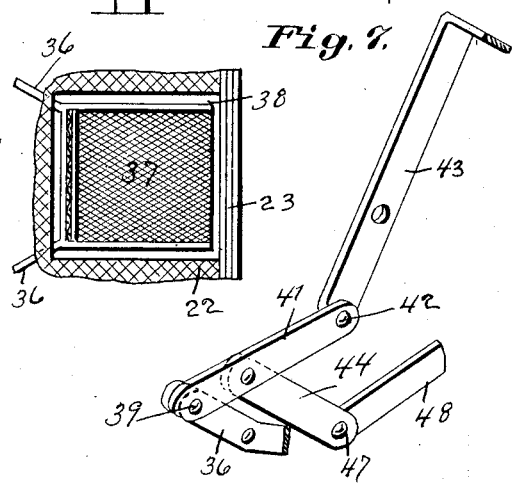

Patented Apr. 9, 1929.

1,708,824

UNITED STATES PATENT OFFICE.

ANDREW S. BAKER, OF LOS ANGELES, CALIFORNIA, ASSIGNOR, BY DIRECT AND MESNE ASSIGNMENTS, TO THE BAKER AUTOMATIC TRAPNEST COMPANY, INC., OF CARSON CITY, NEVADA, A CORPORATION OF NEVADA.

TRAP NEST.

Application filed October 5, 1927. Serial No. 224,204.

This invention relates to improvements in trap nests.

The principal object of this invention is to provide a nest wherein the hen enters, deposits the egg and leaves from the opposite side.

Another object of the present invention is to produce a nest wherein if no egg is deposited the hen will have to return from the enclosure from which it came.

Another object is to produce a trap nest which will not overheat the hens.

A further object is to eliminate much of the labor incident to handling eggs.

A still further object is to produce a trap nest wherein the producing hens may be segregated for breeding purposes.

Other objects and advantages will be apparent during the course of the following description.

In the accompanying drawings forming a part of this specification, and in which like numerals are employed to designate like parts throughout the same, Figure 1 is a vertical cross-section taken on the line 1—1 of Figure 5 and showing certain parts in elevation, Figure 2 is a top plan view of Figure 1, partly broken away in order to better illustrate the invention, Figure 3 is a rear elevation of the entrance gate, Figure 4 is an enlarged detail view showing one of the positions the gate will assume, Figure 5 is a cross-sectional view taken on the line 5—5 of Figure 1 and showing certain of the parts in elevation, Figure 6 is a fragmentary detail view showing the egg spoon, and Figure 7 is a detail perspective view showing the operating lever arrangement.

Where large numbers of hens are raised, certain of the hens are known as layers while others are non-producers. It is to segregate the producers from the non-producers that I have devised my present invention.

I am aware of the fact that trap nests have been heretofore devised. These trap nests have, in most instances, confined the hen thus trapped in such a manner that the hen becomes over-heated and in some instances no provision for releasing the hen is made, except by manually opening the trap. When a large number of hens are kept, an individual person is required to perform this labor.

In the accompanying drawings wherein for the purpose of illustration is shown a preferred embodiment of my invention, the numerals 5, 6, 7 and 8 refer to uprights which are connected by cross pieces 9, and 11. This forms a frame to which side boards 12 and 13 are secured. It is between these side boards that my trap nest proper is constructed. Secured to one end of the boards 12 and 13 are collapsible link gates designated as a whole by the numerals 14 and 16, the gate 14 being secured to the end of the board 12 and the gate 16 being secured to the end of the board 13. The links of the gate 14 are designated by the numeral 15 and the links of the gate 16 are designated by the numeral 20. The end of the trap to which these gates are secured will be hereinafter termed the entrance end.

Slats 17, 18, 19 and 21 serve to permit the hen walking onto the nest. The nest consists of a screen basket 22 secured in a U-shaped frame 23 which is pivoted as at 24 and 26 to the cross-piece 21. The free ends of the U-shaped frame 23 are pivoted as at 27 and 28 to links 29 and 31, respectively in the gates 14 and 16, respectively.

Movable weights 32 are slidably secured upon the arms of the U-shaped frame at a point between their fulcrum points and their connection to the gate links.

Positioned above the nest and extending between the boards 12 and 13 is a substantially semi-circular closure 33 which is slidable upon tracks 34 secured to the side pieces 12 and 13. This semi-circular closure may be moved upon the tracks 34 through the medium of levers disposed upon opposite sides of the nest and as both of these lever arrangements are identical, but one will be hereinafter described.

Pivoted to the board 12 is an arm 36 which is secured to an egg spoon 37. This egg spoon lies beneath an opening 38 formed in the nest 22. The upper end of the arm 36 has pivoted thereto as at 39 a link 41 which is in turn pivoted as at 42 to a rocker arm 43. The upper extremity of which is secured to the semi-circular closure 33. The rocker arm 43 is pivoted to the board 12 as at 40.

A depending link 44 is pivoted as at 46 to the link 41 and has its lower extremity pivoted as at 47 to a re-setting arm 48 pivoted as at 49 and carrying a screen platform 51.

A chute 52 extends downwardly beneath the nest 22 and is curved in such a manner that the spoon 37 will travel along the chute. The lower extremity of the chute is in close relation to a conveyor 53 passed over rollers 54 and 56 and driven by a motor 57 through the medium of a belt 58. A collecting receptacle is shown at 59, which may take any preferred form.

The manner of operating my trap nest is as follows:—

Assuming that the same is installed in a hen house, the hen enters between the gates 14 and 16 walking upon the slats 17, 18, 19 and 21 and onto the nest 22. As the closure screen 33 is in the full line position of Figure 1, the hen cannot pass beyond the nest. Immediately upon stepping onto the nest, the nest will drop thereby closing the gates 14 and 16. Should the hen lay an egg in the nest the same will roll through the opening 38 onto the spoon 37 which will then descend thereby depositing the egg in the chute 52, after which it will roll onto the conveyor 53 and be delivered at a remote point.

The downward movement of the spoon will act through the arm 36 and links 41 and lever 43 to cause the screen closure 33 to move from the position shown in Figure 1 to the position shown in Figure 4, after which time, the hen may walk across the platform 51 and into a different portion of the hen house or runway.

The act of going over the platform 51 will cause the re-setting of the closure screen 33 from its released position of Figure 4 to its trapping position of Figure 1.

The counter-weights 32 and 61 are movable and serve the purpose of balancing the parts so that a pullet egg will operate the device as readily as a larger egg, and also to permit a light weight hen to pass over the platform and operate the device equally well.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:—

In a trap nest of the character described, a pair of spaced members, gates pivotally connected to said spaced members, said gates being adapted to move toward and away from each other in a vertical plane so as to restrict passage between said spaced members, a nest pivotally supported between said members, connecting means between said nest and said gates for closing said gates upon the depression of said nest, a closure screen pivotally supported between said spaced members and adapted to overlie said nest, a pivoted egg spoon positioned beneath said nest and capable of moving said screen to exit position when said spoon is depressed, and means for returning said screen to an entering position after the hen leaves the nest.

In testimony whereof I affix my signature.

ANDREW S. BAKER.